United States Patent [19]

Schrenk

[11] Patent Number: 4,613,054

[45] Date of Patent: Sep. 23, 1986

[54] FILLER BODY FOR RECEPTACLES FOR COMBUSTIBLE FLUIDS AND METHOD OF MAKING SAME

[76] Inventor: Hannes Schrenk, Schneeberggasse 10, A-2700 Wiener Neustadt, Austria

[21] Appl. No.: 779,088

[22] Filed: Sep. 20, 1985

[30] Foreign Application Priority Data

Sep. 20, 1984 [AT] Austria .................................. 2990/84

[51] Int. Cl.⁴ ............................................ B65D 25/00
[52] U.S. Cl. ................................................. 220/88 R
[58] Field of Search ........................... 220/88 R, 88 A

[56] References Cited

U.S. PATENT DOCUMENTS 3,349,953 10/1967 Conaway et al. ................ 220/88 R
3,356,256 12/1967 Szego ................................ 220/88 R
3,822,807 7/1974 MacDonald et al. ............ 220/88 R

*Primary Examiner*—George T. Hall
*Attorney, Agent, or Firm*—Karl F. Ross; Herbert Dubno

[57] ABSTRACT

A filler body for introduction into a receptacle for liquid or gaseous combustibles, e.g. gasoline, consists of a ball of expanded metal, especially aluminum foil.

12 Claims, 2 Drawing Figures

FILLER BODY FOR RECEPTACLES FOR COMBUSTIBLE FLUIDS AND METHOD OF MAKING SAME

FIELD OF THE INVENTION

My present invention relates to a filler body for the filling of a receptacle for liquid or gaseous combustibles, e.g. liquid or gaseous fuels and especially gasoline, intended to prevent or retard explosive combustion. The invention also relates to a method of preventing explosive combustion in fuel tanks, to fuel tanks protected against explosive combustion and to a method of making the filler body and to an apparatus for carrying out this method.

BACKGROUND OF THE INVENTION

To prevent explosive combustion in combustible liquids or gases in receptacles, e.g. fuel tanks, it is already known to provide the tank during its manufacture with a filler in the form of a body of expanded metal composed of thin aluminum foil. The disadvantage of incorporating a block of the expanded aluminum foil in a fuel receptable or tank, however, is that the dimensions of the expanded metal body make it difficult to remove the body even with deformation and distortion thereof or make it impossible to remove the body from the tank. Such a removal of the filler from the tank may become necessary or desirable for cleaning of the tank or for repair thereof.

In addition, it has been impossible to introduce conventional tank-filler bodies of expanded metal into already fabricated fuel tanks or receptacles, also because of the dimensional factors mentioned previously.

OBJECTS OF THE INVENTION

It is, therefore, the principal object of the present invention to provide a filler body for a fuel tank which is composed of expanded metal, whereby these drawbacks are avoided.

Another object of this invention is to provide a receptacle for liquid or gaseous combustibles which can be operated more effectively because it permits removal of the expanded metal filler or introduction of an expanded metal filling in the prefabricated stage of the tank.

It is yet another object of my invention to provide an improved method of making the new expanded metal packing of the invention.

A further object of the invention is to provide an improved apparatus for making expanded metal bodies for use as a filling for combustible-fluid receptacles.

A more general object of the invention is to overcome drawbacks and disadvantages of prior art systems through the use of an improved expanded metal filling for receptacles for liquid and gaseous fuels.

SUMMARY OF THE INVENTION

These objects and others which will become apparent hereinafter are attained, in accordance with the present invention in accordance with which the expanded metal filling for a liquid or gaseous combustible receptacle is constituted of balls having substantially a smooth outer surface and a large-pore internal structure of expanded metal, especially expanded aluminum foil having a thickness of 60 to 80 microns ($\mu$m).

It has been found, surprisingly, that a packing of the fuel tank with such expanded metal balls has a highly effective explosion-limiting character with minimum restriction of the available fluid-filling volume so that the effect is similar to that obtained with a solid block of the expanded metal but the balls can be introduced through the filling spout of the tank or emptied from the latter through the spout.

The filling bodies of the invention have a high degree of form stability and the packing as a whole has a high degree of form stability so that even with operation in gasoline tanks for vehicles and the like over long periods of time, there is no settling of the balls and the tank can remain completely filled with them to the degree that the tank was originally charged with such balls.

The method of making the filler bodies of the invention, preferably comprises feeding a strip or web of the expanded metal foil, i.e. the expanded aluminum foil, in a longitudinal direction while rolling the same to form a tubular structure with the expanded metal tube being thereupon cut into hollow cylindrical pieces which are deformed into balls in a press.

Advantageously, the strip of expanded aluminum foil has a width of about 15 cm and is rolled into a tube with a diameter of about 2 cm.

The tube is then cut into lengths of 5 to 6 cm.

The apparatus which is used for this purpose comprises substantially a funnel-shaped sleeve, such as a calibrating nozzle, a cutting device and a press operating with mutually concave anvil and ram which forms the cylinder into the ball.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
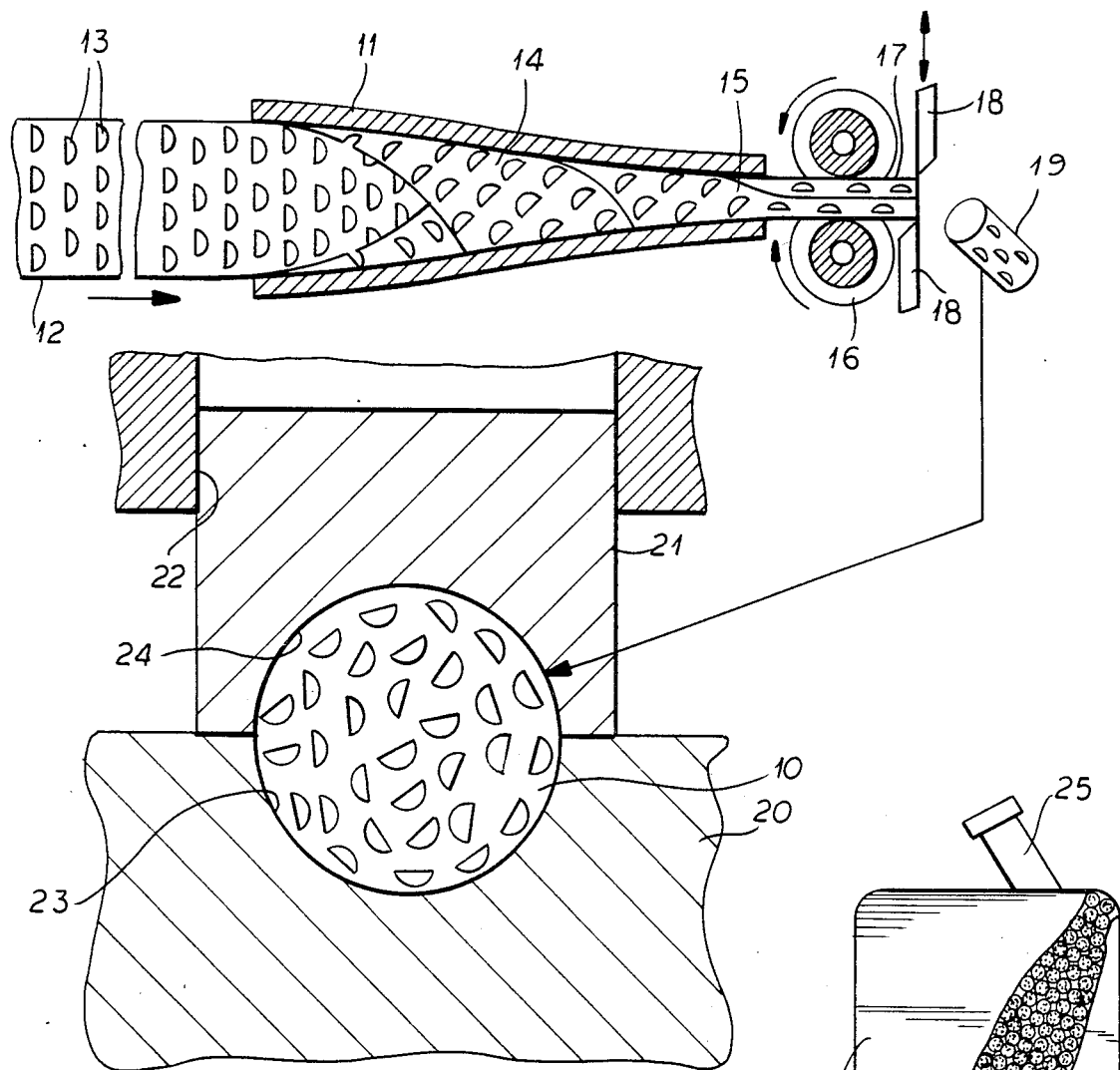
FIG. 1 is a diagram illustrating the method of the invention in its successive steps and showing the associated apparatus in cross section.

In FIG. 1 I have shown an apparatus for the fabrication of expanded-metal aluminum balls 10 which comprises a funnel-shaped sleeve 11 into which a web 12 or strip of expanded aluminum foil is fed. The expanded aluminum foil, previously provided with staggered slits and stretched to form the openwork characteristic of expanded metal and represented diagrammatically by the perforations 13 can have a thickness of 60 to 80 microns.

The strip is advanced into the frustoconical or funnel-shaped nozzle (calibrating nozzle) 11 in which the strip is rolled, as can be seen at 14, into a tutular structure 15, advanced by a pair of grooved rollers from the rolling stage.

Beyond the rolling stage, the tubular expanded metal strand 17, of a diameter of about 2 cm, is sliced by the blades 18 into lengths 19 of 5 to 6 cms.

The pieces 19 are then introduced between an anvil 20 and a ram 21 slidable in a cylinder 22 to form the balls 10. To this end, the anvil 20 and the ram 21 have hemispherically concave dies 23 and 24, thereby forming the pieces into balls 10.

Figure 2:
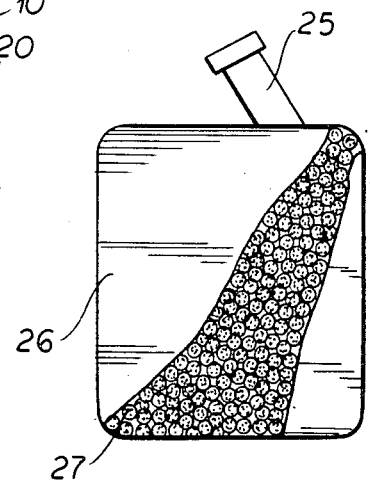
FIG. 2 is a fragmentary elevational view, partly broken away, of a gasoline tank provided with the filling of the invention.

As can be seen from FIG. 2, the balls 10 can be filled into the spout 25 of an gasoline tank 26 to form the highly porous packing 27 which substantially completely fills the tank.

I claim:

1. A filler body for introduction into a receptacle for a combustible liquid or gas, especially gasoline for hindering explosion-like combustion, comprising a ball having substantially a smooth outer surface and a large-pore internal structure composed of expanded metal.

2. The body defined in claim 1 wherein said expanded metal is expanded aluminum.

3. The body defined in claim 2 wherein said expanded aluminum is a foil having a thickness of 60 to 80 microns.

4. A method of making a filler body for introduction into a receptacle adapted to contain a combustible liquid or gas to restrict explosion-like combustion therein, comprising the steps of:

rolling an expanded metal strip into a substantially tubular cylindrical strand;

severing said strand into respective hollow cylindrical pieces; and pressing said pieces into respective balls having substantially a smooth outer surface and a large-pore internal structure.

5. The method defined in claim 4 wherein said strip is expanded aluminum foil having a thickness of 60 to 80 microns.

6. The method defined in claim 5 wherein said strand has a diameter of about 2 cm.

7. The method defined in claim 6 wherein said pieces are cut to a length of 5 to 6 cm.

8. An apparatus for carrying out the method of claim 4 which comprises a funnel-shaped calibration nozzle into which said strip is fed for rolling same to form said strand.

9. A method of preventing explosion-like combustion in a receptacle for a combustible liquid or gas which comprises the steps of:

forming an expanded metal strip into a multiplicity of expanded metal balls having substantially a smooth outer surface and a large-pore internal structure; and substantially filling said receptacles with said balls.

10. A receptacle for a combustible liquid or gas substantially filled with balls of expanded metal as defined in claim 1.

11. The receptacle defined in claim 10 wherein said expanded metal is aluminum.

12. The receptacle as defined in claim 11 wherein said expanded metal is an aluminum foil having a thickness of 60 to 80 microns.

* * * * *